United States Patent [19]
Booker et al.

[11] Patent Number: 4,759,716
[45] Date of Patent: Jul. 26, 1988

[54] ROTATING COLOR MAPPED RADAR SWEEP SIMULATOR

[75] Inventors: John L. Booker; Roger H. Werner, both of Orlando, Fla.

[73] Assignee: The United States of America as represented by the Secretary of the Navy, Washington, D.C.

[21] Appl. No.: 845,092

[22] Filed: Mar. 21, 1986

[51] Int. Cl.⁴ .............................................. G09B 9/00
[52] U.S. Cl. ......................................................... 434/3
[58] Field of Search ................... 434/2, 3, 6; 342/185, 342/169

[56] References Cited

PUBLICATIONS

C64 User's Manual, Copyright 1984, Commodore Electronics, Ltd.

*Primary Examiner*—Thomas H. Tarcza
*Assistant Examiner*—Mark Hellner
*Attorney, Agent, or Firm*—Robert W. Adams

[57] ABSTRACT

A rotating cursor plan position indicator radar display is simulated upon a color mapped computer driven raster scan CRT display by logically dividing the pixels of the display into a plurality of wedge shaped regions. The color attributes of the pixels in each region are changed in a systematic fashion in order to simulate the appearance of a standard radar display for radar operator training purposes.

1 Claim, 1 Drawing Sheet

ROTATING COLOR MAPPED RADAR SWEEP SIMULATOR

BACKGROUND OF THE INVENTION

This invention relates in general to computer-driven training machines for radar operators, and in particular to a method for using a raster scan video display to simulate the appearance of radar plan position indicator CRT, with a rotating line cursor.

Past implementations of radar sweep simulations have used vector, rather than rastor, displays. Alternatively, raster displays with special purpose sweep generator hardware were used.

For example, a radar simulator using a vector display is disclosed in U.S. Pat. No. 2,902,670. Another vector display scheme is disclosed in U.S. Pat. No. 4,228,598.

The present invention avoids the need for specialized hardware in order to simulate a PPI rotating line cursor display. Simulation is achieved using any conventional raster scan display which has color-mapped video.

SUMMARY OF THE INVENTION

One object of this invention is to simulate the appearance of a rotating line cursor PPI radar scope upon a conventional raster scan video display.

Another object of this invention is to provide means for adapting existing raster scan video hardware to the task of radar simulation without the need for hard-wired modifications or special purpose sweep generator hardware.

Another object of this invention is to simulate a rotating cursor PPI display without using computationally-intensive algorithms which logically rotate the entire display in video memory.

These and other objects are achieved by logically segregating the color attributes bytes, associated with each pixel in the video memory, into a plurality of groups. Each group of color attribute bytes controls the color of all pixels in a narrow, wedge-shaped polygon of the display surface, extending from the display center, to the periphery of circular, simulated radar scope display.

All members of each group are loaded with index numbers. These numbers are indices to one of a plurality of color registers. The content of each color register thus determines what color or graytone will be displayed by the wedge-shaped polygon of pixels associated with each group of color attribute bytes.

Motion of the radar cursor is simulated by rotation of values held in the color registers rather than changing the values held in color attribute memory.

DETAILED DESCRIPTION OF THE INVENTION

Figure 1:
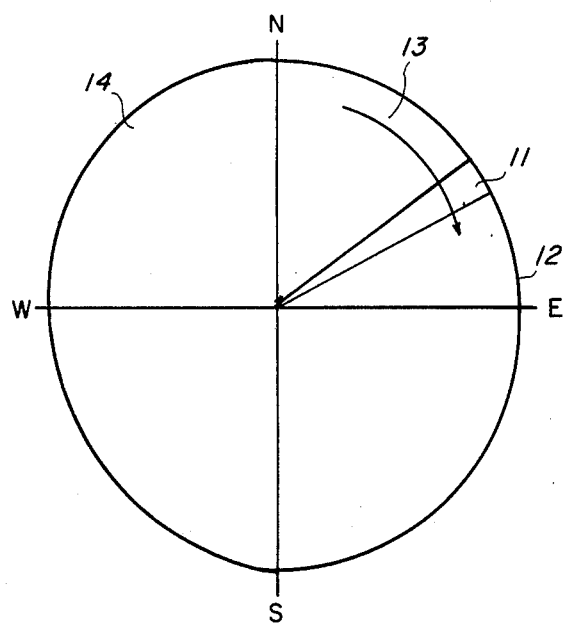
FIG. 1 is a diagram of a simulated radar Plan Position Indicator (PPI) display.

FIG. 1 is a diagram of a simulated radar plan position indicator (PPI) display of the type which may be generated using this invention. The cursor 11 of the PPI display may be represented by a narrow wedge-shaped polygon extending from the center of the display to the circular boundary 12. The arrow 13 indicates that, in this instance, the cursor is rotating in a clockwise direction. The cursor is a bright line rotating upon a darker background 14.

Figure 2:
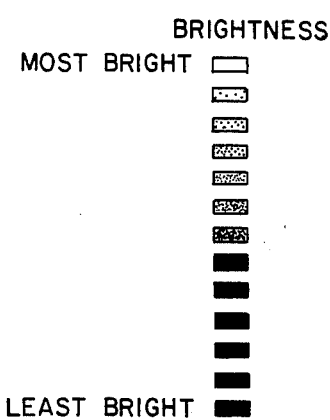
FIG. 2 is a diagram of a PPI display at a certain instant in time.

FIG. 2 is a diagram of a color-mapped radar scan display as used in this invention, frozen at a particular instant in time. The pixels of the display are logically divided into a plurality of wedge-shaped polygonal regions. Each polygonal region of the display surface is associated with a group of color-attribute bytes which control the brightness of the pixels within the wedge-shaped polygonal region. A color attribute byte is a locator in memory, associated with a given pixel, that contains information regarding the color, tone, or other quality to be exhibited by the the pixel. More than one byte may be associated with a pixel. A group of such bytes may be referred to as a wedge-group.

All members of each wedge-group contain an index number that corresponds to one member of an array of color registers. Each color register contains a number that is associated with a particular color or graytone, referred to hereafter as a tone. These numbers may be called the color numbers.

Cursor display is achieved by first loading the proper set of color numbers into the color regsters. The color number of a bright tone is loaded into one register to generate the cursor. Color numbers for progressively less bright tones are loaded into adjacent registers on one side of the first register. When these numbers are progressively moved from one register to the next, with the number in the last register being wrapped-around to the first register, in a circular fashion, motion of a radar cursor is simulated on the display.

At the instant of time shown in FIG. 2, the simulated cursor is located at wedge 15 of the display. Accordingly, the color register associated with all members of the wedge-group of color attribute bytes pertaining to wedge 15 has been loaded with a number corresponding to a bright tone.

Previously, the cursor, i.e., a wedge of pixels displaying this bright tone, was located at wedge 16, before that at wedge 17, and before that at wedge 18, et cetera. In order to simulate the decaying glow of radar scope phosphorous after cursor passage, these wedges, as of the instant depicted in FIG. 2, have been assigned progressively less bright tones. This has been accomplished by loading the proper color number into the color registers pointed to by the index number contained in each wedge-group.

Thus, by simply changing the content of the color register associated with the various polygonal wedges on the display, in turn, the wedges can be made to display the simulated cursor. Furthermore, the cursor can be given a simulated brightness decay by changing the color numbers contained in registers associated with adjacent wedges, where the cursor was previously located. The proper sequence of changes in color register contents is accomplished by simply rotating the color numbers from one color register to the next, in a circular, wrap-around fashion.

A rotating cursor is thus simulated on a raster scan color mapped display by the simple, progressive change of color numbers contained in the various color registers of a color mapped video system. No computations for display rotation are required.

Figure 3:
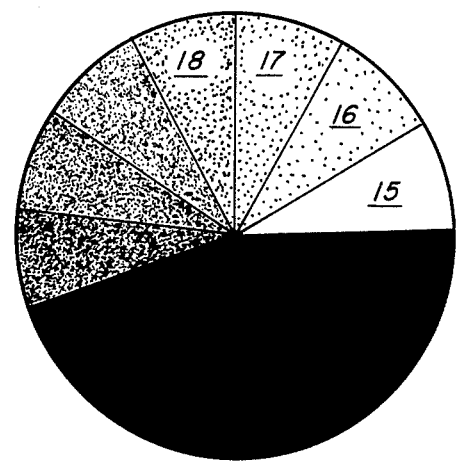
FIG. 3 is a diagram of the same display of FIG. 2, at a slightly later time.
Figure 3:
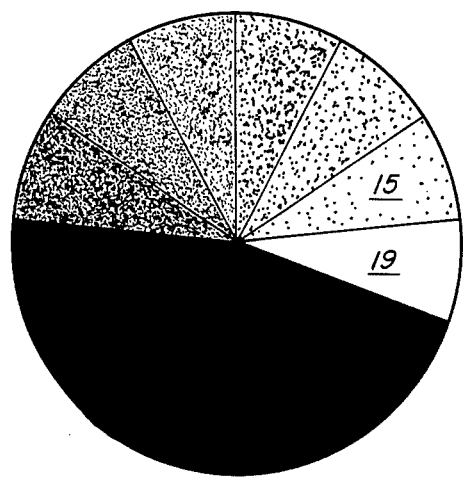

FIG. 3 is a diagram of the same display shown in FIG. 2, at the next instant of time. Now, wedge 19, previously containing the darkest available tone, has been loaded with the brightest available tone, used to depict cursor location. Wedge 15, the previous cursor location, has been dimmed, and adjoining wedges have been further dimmed.

Simulated radar returns, i.e. targets, may be displayed by altering the video attribute bytes of locations corresponding to pixels where targets or other returns are to appear. As previously described, the color of each wedge of the display is changed each time the simulated cursor is moved, so that the updated cursor location is shown, together with a proper phosphorous brightness decay pattern following the cursor. Thereafter, selected video bytes corresponding to the desired target location can be altered so that the target location pixel is caused to display a tone brighter than that of the surrounding wedge.

In a preferred mode for this invention, the brightness of a target pixel is set relative to the brightness of the wedge in which the target is located. Thus, a target pixel located in a wedge which was recently the cursor wedge is set to be brighter than is a target pixel located in a wedge which less recently acted as the simulated cursor. If this is done, the target pixels will appear to gradually decline in brightness after cursor passage just as do target returns on an actual PPI CRT.

The proper brightness of a target pixel can be determined after each movement of the simulated cursor as follows:

(a) The bytes of a given wedge-group are caused to contain an index number to a particular color register. This is accomplished as described above.

(b) A subroutine for writing targets to the display reads the video attribute byte pertaining to the pixel where the target is to be displayed. The number here is an index to one member of the array of color registers.

(c) The target writing subroutine examines the contents of this color register.

(d) Given the wedge color number contained in the color register examined in step (c), the subroutine selects a color number for the preferred target brightness from a table. The address of a color register containing this preferred brightness color number is written to the video attribute byte corresponding to the pixel or pixels where the target is to be displayed. A separate array of color registers may be dedicated to the task of target brightness display, if desired.

Target pixels remain bright for a long time after the cursor pixels have faded, and do not fade entirely until just before the cursor is to arrive again. This simulates the operation of PPI CRT display.

Target brightness may be determined by a separate set of color registers, the contents of which are rotated at the same rate as the set of cursor color registers. A separate bit of plane can keep track of which pixels contain targets.

Clearly, many alternatives can be made in the above described scheme for using a conventional raster scan display in simulating a PPI radar display. The essence of this invention lies not in the particular algorithms that are used to write pixels and target brightness into video memory so much as in the general concept of achieving the appearance of a rotating radar cursor by merely rotating a group of numbers contained in the color registers.

Likewise, the subroutine for determining optimum target brightness could be rewritten in many equivalent ways to cause a similar display to exist.

Furthermore, this scheme may be applied to simulate displays other than a linear cursor circulating about the center of a PPI scope. If pixels are grouped in concentric circles about the center of the display, rather than as wedges, a concentric circle sonar display could be simulated.

EXAMPLE

The following is a program listing written in VAX/VMS Fortran. The program generates a simulated PPI rotating cursor radar display on a conventional raster scan video output device.

The program operates in conjunction with a Metheus Omega 500 Display Unit driven by a Microvax I computer. Graphics calls used in the Fortran program are defined in the "Omega 500 Display Controller Reference Manual" dated Aug. 1, 1984, by Matheus Corporation, Hillsboro, Ore.

```
PARAMETER (NWEDGS=100)     ! Number of Wedges
PARAMETER (GRAD=2*3.14159/NWEDGS)! (converts wedge to radians)
INTEGER COLORS
COMMON/COL/COLORS(NWEDGS)
CALL INI(500)              ! INITIALIZE GRAPHICS DEVICE
CALL CLEAR                 ! CLEAR SCREEN
DO I=1,NWEDGS              ! DEFINE COLORS:
    COLORS(I)=(I-1)*2.55        ! Save colors at host
    CALL CMAP(I,0,COLORS(I),0)! ! Initial color map loading
END DO
DO I=1,NWEDGS              ! DEFINE AND DRAW TRIANGULAR
                              WEDGES:
    THETA=(I-1)*GRAD
    IX2=511+400*COS(THETA) !  (theta in radians)
    IY2=511+400*SIN(THETA)
    THETA=I*GRAD
    IX3=511+400*COS(THETA)
    IY3=511+400*SIN(THETA)
C   Draw a triangle between points (511,511),(IX2,IY2),(IX3,IY3)
C   of color I ((511,511)=center of circle):
    CALL TRINGL(511,511,IX2,IY2,IX3,IY3,I)
END DO
DO WHILE (.TRUE.)
    DO J=0,NWEDGS-1        ! For all wedge colors:
        DO I=1,NWEDGS      !  COLOR MAP ROTATION:
            K=I+J
            IF (K.GT.NWEDGS) K=K-NWEDGS
```

-continued

```
                CALL CMAP(K,0,COLORS(I),0)!(actually a reload of color
c                    map on Metheus 500 since it has no color map
c                    rotate instruction)
              END DO
              CALL SENDF              ! flush interface buffer
          END DO
        END DO ! (endless loop)
C       TERMINATE THE DEVICE DRIVER
        CALL FINI
        STOP
        END
        SUBROUTINE TRINGL(IX1,IY1,IX2,IY2,IX3,IY3,ICOLOR)
C    Draws a triangle between given points and fills it with given color number
        CALL POLYS                    ! Start polygon definition
        CALL POLYV(IX1,IY1)           ! Add polygon vertex
        CALL POLYV(IX2,IY2)           ! add polygon vertex
        CALL POLYV(IX3,IY3)           ! add polygon vertex
        CALL POLYO                    ! Outline polygon
        CALL SETCOL(ICOLOR)           ! set polygon color number
        CALL POLYF                    ! fill polygon with current color number
        RETURN
        END
```

What we claim is:

1. Apparatus to simulate the appearance of the rotating line cursor display of a plan position indicator, comprising:
 a raster scan display device having color-mapped video and a plurality of pixels; and,
 a general purpose digital processor programmed to logically divide said pixels into a plurality of wedge-shaped polygonal regions each having its apex at the centroid of the display provided by said device, assign a separate register to each said region, store a color number in each said register such that the color numbers in adjacent registers are sequential in a preselected forward direction, and then predeterminedly move the color number in each register from register to register to simulate in said raster scan display the rotating line cursor of a plan postion indicator; and, to logically read the video attribute byte pertaining to the preselected pixel whereat a target is to be displayed, select a target brightness for said pixel compared to the color number in the register of the wedge pertaining to said byte from a predetermined table of color registers, and write the address of the selected register to said pixel.

* * * * *